(12) United States Patent
Li et al.

(10) Patent No.: US 10,873,209 B2
(45) Date of Patent: Dec. 22, 2020

(54) SYSTEM AND METHOD FOR DYNAMIC ENERGY STORAGE SYSTEM CONTROL

(71) Applicant: PEAK POWER INC., Toronto (CA)

(72) Inventors: Yiran Li, Toronto (CA); Peisen Hu, Markham (CA); Derek Lim Soo, Toronto (CA); Matthew Sachs, Toronto (CA)

(73) Assignee: PEAK POWER INC., Toronto (CA)

( * ) Notice: Subject to any disclaimer, the term of this patent is extended or adjusted under 35 U.S.C. 154(b) by 0 days.

(21) Appl. No.: 16/464,947

(22) PCT Filed: Nov. 29, 2017

(86) PCT No.: PCT/CA2017/051435
§ 371 (c)(1),
(2) Date: May 29, 2019

(87) PCT Pub. No.: WO2018/098575
PCT Pub. Date: Jun. 7, 2018

(65) Prior Publication Data
US 2019/0312457 A1 Oct. 10, 2019

Related U.S. Application Data

(60) Provisional application No. 62/427,199, filed on Nov. 29, 2016.

(51) Int. Cl.
*H02J 13/00* (2006.01)
*H02J 15/00* (2006.01)
(Continued)

(52) U.S. Cl.
CPC ............ *H02J 13/00* (2013.01); *G05B 13/029* (2013.01); *G06N 3/006* (2013.01); *G06N 3/02* (2013.01);
(Continued)

(58) Field of Classification Search
CPC .. H02J 13/00; H02J 15/00; H02J 3/003; H02J 2203/20; H02J 13/00034; H02J 3/32;
(Continued)

(56) References Cited

U.S. PATENT DOCUMENTS 8,548,638 B2 * 10/2013 Roscoe ..................... H02J 3/14
700/296
9,705,361 B2 * 7/2017 Ishibashi ................. H02J 9/062
(Continued)

FOREIGN PATENT DOCUMENTS

CN 103545843 1/2014

OTHER PUBLICATIONS

International Search Report and Written Opinion in the corresponding PCT/CA2017/051435, dated Feb. 26, 2018.

*Primary Examiner* — Ramesh B Patel
(74) *Attorney, Agent, or Firm* — Norton Rose Fulbright Canada LLP

(57) ABSTRACT

A control system for controlling an energy storage system includes a controller including a plurality of layered nodes configured to form an artificial neural network trained to generate a forecasted transmission level load and confidence value for an entire jurisdiction of a utility distribution system. The controller includes at least one memory and at least one processor configured for: identifying a potential coincident peak for the utility distribution system based on the forecasted transmission level load and confidence value generated by the artificial neural network; and upon identifying a potential coincident peak, transmitting signals to cause the electrical infrastructure to consume energy stored at the energy storage system thereby reducing the energy drawn from the utility distribution system during the identified potential coincident peak.

20 Claims, 7 Drawing Sheets

(51) Int. Cl.

| | | |
|---|---|---|
| *G06Q 50/06* | (2012.01) | |
| *G05B 13/02* | (2006.01) | |
| *G06Q 10/04* | (2012.01) | |
| *G06N 3/00* | (2006.01) | |
| *G06N 3/08* | (2006.01) | |
| *G06N 3/02* | (2006.01) | |
| *G06N 20/10* | (2019.01) | |
| *H02J 3/00* | (2006.01) | |

(52) U.S. Cl.
CPC ............... *G06N 3/08* (2013.01); *G06Q 10/04* (2013.01); *G06Q 50/06* (2013.01); *H02J 15/00* (2013.01); *G06N 20/10* (2019.01); *H02J 3/003* (2020.01); *H02J 2203/20* (2020.01); *Y02P 90/50* (2015.11)

(58) Field of Classification Search
CPC ........... G06N 3/006; G06N 3/08; G06N 3/02; G06N 20/10; G05B 13/029; G06Q 10/04; G06Q 50/06; Y02P 90/50
See application file for complete search history.

(56) References Cited

U.S. PATENT DOCUMENTS

| | | | |
|---|---|---|---|
| 9,852,481 B1* | 12/2017 | Turney | G06Q 50/06 |
| 10,268,171 B2* | 4/2019 | Sunamori | H02J 13/00 |
| 2009/0063257 A1* | 3/2009 | Zak | G06Q 30/0202 |
| | | | 705/7.31 |
| 2013/0030590 A1* | 1/2013 | Prosser | H02J 3/28 |
| | | | 700/295 |
| 2015/0094968 A1* | 4/2015 | Jia | G06Q 40/04 |
| | | | 702/60 |
| 2016/0072289 A1* | 3/2016 | Lazaris | G06F 30/20 |
| | | | 700/287 |
| 2016/0141873 A1* | 5/2016 | Ellice-Flint | H02J 3/38 |
| | | | 307/20 |
| 2017/0373500 A1* | 12/2017 | Shafi | H02J 3/28 |

\* cited by examiner

Self-Learning

Neural Network Training a. Self-Learning

SYSTEM AND METHOD FOR DYNAMIC ENERGY STORAGE SYSTEM CONTROL

CROSS-REFERENCE TO RELATED APPLICATIONS

The present disclosure claims all benefit including priority to U.S. Provisional Patent Application 62/427,199, filed Nov. 29, 2016, and entitled "SYSTEM AND METHOD FOR FORECASTING UTILITY POWER LOADS WITH MACHINE LEARNING", the entirety of which is hereby incorporated by reference.

FIELD

The present disclosure generally relates to the field of energy storage systems, and more particularly, embodiments of the present disclosure relate to systems and methods for the dynamic control of energy storage systems.

BACKGROUND

Electricity bills typically have a component that is based on the amount of energy used, measured in kilowatt hours (kWh), as well as a component based on the maximum instantaneous demand, measured in kilowatts (kW). Utilities are tasked with providing uninterruptible power for all customers at all time, but electricity demand varies greatly throughout the day and year. To account for this problem of "peak demand", utilities must have excess capacity available for these constrained moments, but this excess capacity comes at a cost. Electricity during peak events can cost 50-70 times more to produce than off-peak electricity on the wholesale market level.

Traditional utility models are based on centralized generating plants sending electricity out over a transmission and distribution system to the paying customers. In this model, the Independent System Operator (ISO) is responsible for ensuring that supply and demand are always equally matched within its respective market. However, in order to ensure that there is adequate supply to meet the demand there must be enough power generating assets available for moments of peak demand. These systems are very inefficient, as peak demand may occur for only a few hours per year. As a result, "peaker plants" or, plants which are only used during moments of peak demand, are very expensive to run, and often are polluting significantly more than base power generation.

Recognizing these problems, many utility related organizations have moved to capacity based pricing modules, in which all or a part of the energy consumers bill is based off of how much energy draw the consumer is using at the moment of peak demand.

In many jurisdictions, the utility tariff structure includes a component based on the customer's average energy demand (kW) during the hour that the whole electrical system within an ISO jurisdiction is at its peak. This is called the "coincident peak" and it takes different forms in different jurisdictions. In Ontario, Class A customers pay their share of Global Adjustment charges based on the customer's share of the total system load during five non-consecutive hour-long coincident peaks. NYISO (New York Independent System Operator), PJM™ and other jurisdictions have similar fees based off of the customer's share of the total system load during one or more hour-long peaks for the year. In New York, it is called the (Installed Capacity) ICAP.

SUMMARY

In some embodiments, aspects of the present disclosure may reduce the energy demand of a customer's electrical infrastructure during coincident peak events. In some situations, this may reduce the overall load on the electrical system, and may reduce the electrical costs charged by the utility.

In accordance with an aspect, there is provided a control system for controlling an energy storage system. The control system includes: a meter interface for receiving meter data from at least one metering device positioned to track energy drawn by an electrical infrastructure from a utility distribution system; an energy storage system interface for communicating with an energy storage system connected to the electrical infrastructure, the energy storage system having an energy capacity and an output power rating; and a controller including a plurality of layered nodes configured to form an artificial neural network trained to generate a forecasted transmission level load and confidence value for an entire jurisdiction of the utility distribution system. The controller includes: at least one memory and at least one processor configured for: identifying a potential coincident peak for the utility distribution system based on the forecasted transmission level load and confidence value generated by the artificial neural network; and upon identifying a potential coincident peak, transmitting signals to cause the electrical infrastructure to consume energy stored at the energy storage system thereby reducing the energy drawn from the utility distribution system during the identified potential coincident peak.

In accordance with another aspect, there is provided: a method for controlling an energy storage system. The method includes: receiving meter data from at least one metering device positioned between a utility distribution system and an electrical infrastructure, the at least one metering device for tracking energy drawn from the utility distribution system; using real-time or near real-time historical and current electricity consumption and generator data with a plurality of layered nodes configured to form an artificial neural network, generating a forecasted transmission level load and confidence value for an entire jurisdiction of the utility distribution system; identifying a potential coincident peak for the utility distribution system based on the forecasted transmission level load and confidence value generated by the artificial neural network; and upon identifying a potential coincident peak, transmitting signals to cause the electrical infrastructure to consume energy stored at the energy storage system thereby reducing the energy drawn from the utility distribution system during the identified potential coincident peak.

In accordance with another aspect, there is provided a device for controlling an energy storage system. The device includes at least one memory and at least one processor providing a plurality of layered nodes configured to form an artificial neural network trained to generate a forecasted transmission level load and confidence value for an entire jurisdiction of the utility distribution system. The at least one processor is configured for: identifying a potential coincident peak for the utility distribution system based on the forecasted transmission level load and confidence value generated by the artificial neural network; and upon identifying a potential coincident peak, transmitting signals to cause the electrical infrastructure to consume energy stored at the energy storage system thereby reducing the energy drawn from the utility distribution system during the identified potential coincident peak.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
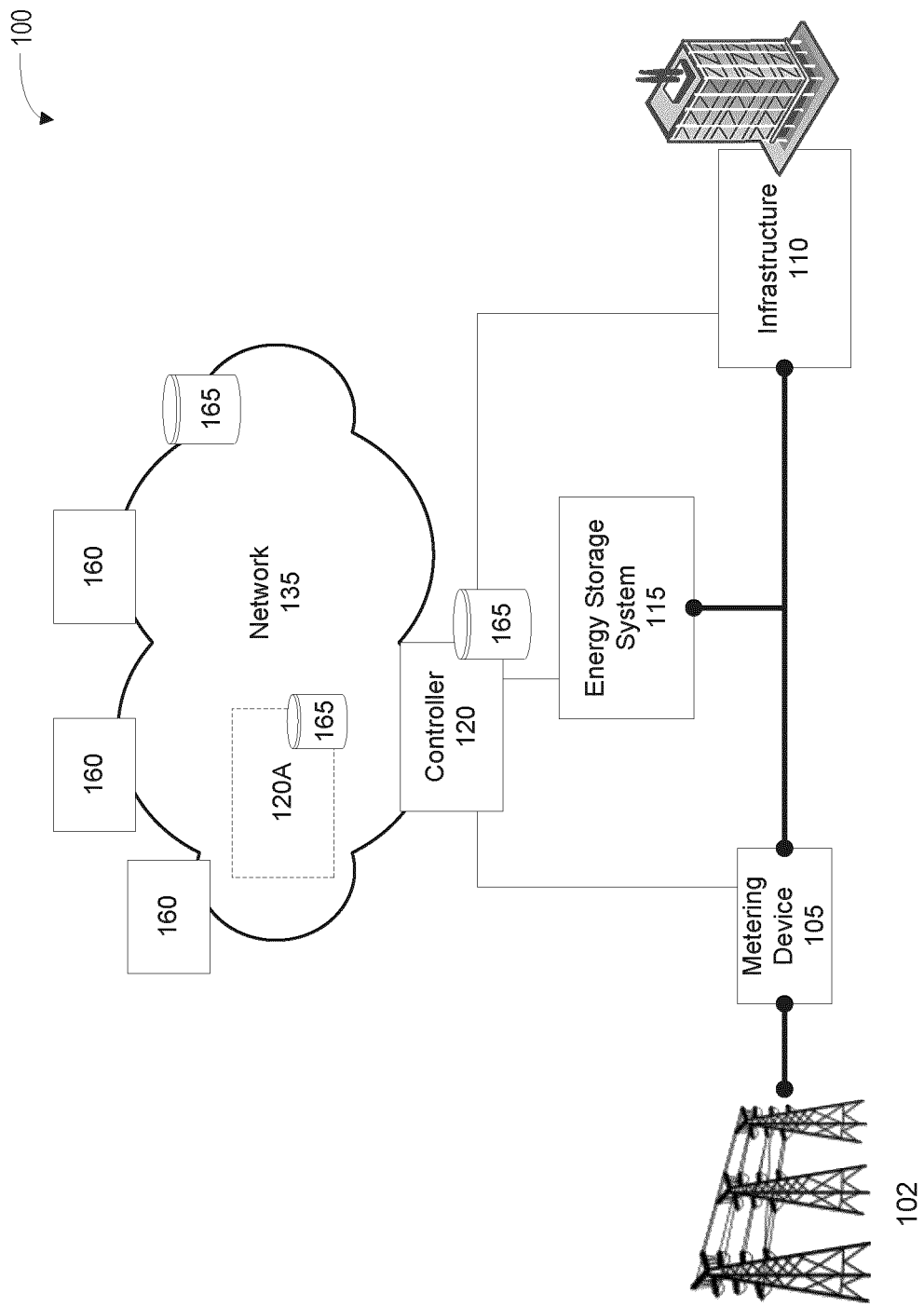
FIG. 1 is a block diagram showing aspects of an example system for controlling an energy storage system.

One approach to forecasting utility coincident peaks involves the use of regression based statistical analysis. Based on these analyses, large industrial sites can curtail production or shut down entirely during the peak events to reduce costs. Generally, these approaches produce forecast which can only predict the hour of the coincident peak event within a larger window of accuracy (e.g. 4-8 hours). Shutting down or curtailing production (i.e. energy usage) has its own financial costs and can be invasive and problematic to a production facility.

Regression analysis is a forecasting method, predicated on the assumption that it is possible to identify the underlying factors that might influence the variable that is being forecast. A number of regression based techniques have been developed, including linear regression and ordinary least squares regression, for example. Regression based methods are widely used to forecast utility loads, however, in some instances, they suffer from a number of drawbacks. Due to the nonlinear and complex relationship between the load demand and the influencing factors, it is not simple to develop an accurate model. On-site tests of regression based methods have shown a deterioration in performance in cases where the load deviates due to sudden weather changes and load events. One of the main reasons for this drawback is that the models require identifying the consequential factors, and in complicated systems, such as forecasting load utility, there may be additional consequential factors that do not get accurately considered. The shortcomings of regression based forecasting models become even more apparent as utility grids evolve from traditional models to utility models of transactive grids.

In some embodiments, a feature of a transactive grid models is that power generation and power consumption are distributed, rather than concentrated within the grid. Transactive grid models may recognize that both the supply and demand side of power is erratic and variable, and that it is beyond the scope of existing regression models to quickly and accurately ensure that supply matches demand. New platforms and pricing structures are required so that the electrical infrastructure and market design enables accurate price signals to efficiently ensure the balance of supply and demand. Transactive grids are much more dynamic, therefore more accurate methods for load forecasts are necessary. The transactive grid by its very nature requires highly intelligent system and methods that quickly and accurately predict both demand and supply so that the proper scheduling, dispatch and pricing signals can be sent to the market.

If a forecasting process is more accurate, a system will only have to reduce its energy consumption for a smaller period of time resulting is less impact on a facility.

The following describes a system and method to forecast utility power loads utilizing machine learning with deep neural networks. The system and method combine multiple machine learning modules to automate and enable self-learning abilities to improve existing short and long term utility load forecasts using historical load data, weather forecasts, real time transmission system data, and real-time economic factors such as electricity and natural gas pricing, for example.

In some situations, the system described herein may have the potential to forecast loads with more accuracy than current systems. The method described herein allows the provided system to learn utility data to improve existing short term utility load forecasts using energy variables such as historical load data, weather forecasts, real time transmission system data, and real-time economic variants such as electricity and natural gas pricing, for example.

It has been found that the effect of a variable depends on the energy context, which includes whether other variables are present and, more generally, on the utility grid being analyzed. So, whereas a particular variable may be insignificant in one utility context, it may cause a surge or decline in other utility contexts. The systems and methods thus can incorporate prioritization and interpretation of energy variables. Specifically, energy variables can be assessed wherein variables are ranked and presented as a priority list. Such variable prioritization can be used to increase efficiency and accuracy of the system.

In short term utility load forecasting, future values of a time series are assumed to be an unknown function of the past values as well as some external variables that influence the time series. Neural networks are used to approximate this unknown function with relatively high accuracy. The neural networks are trained using a wide range of collected historical data that individually may not seem to be a direct factor relating or influencing the utility load, such as intertie flow data, spark ratios, and previous day and same day previous week load profiles. In some embodiments, the learning environment is structured based on specific power and utility industry insights, resulting in improved learning accuracy and an increase in the speed of generating results through complex computation and algorithms.

It will be appreciated that though an illustrative feedforward network is described herein, the type of neural network implemented is not limited merely to feedforward neural networks but can also be applied to support vector machines, regression models and neural networks, including convolutional neural networks, recurrent neural networks, auto-encoders and Boltzmann machines. Furthermore, the present system and method can also be based on a combination of machine learning modules, including neural networks, support vector machines, and multi-variable regression.

In some embodiments and certain situations, the methods and systems described herein or otherwise may be applied to raw historical energy data, forecast prepared energy data (meaning with regression already applied), or features extracted from such energy data sets or other energy variables such as spark ratio data or intertie flow; the method can compute one or more energy variables, without the need for a baseline average across conditions; the method can detect variables that affect all energy variables in the same way; the method can compare a real-time energy variable to a historical reference energy variable, enabling it to make different predictions for the same variable, depending on utility energy context; the method can compute condition-specific energy variables using a deep neural network, which has at least two layers of processing units; the method can score a variable that has never been seen before; the method can be used to compute a difference between forecast prepared energy data, a reference energy data set and/or raw historical energy data, which can be used to rank any known or unknown energy variable; the method can be used to compute a difference between variables, which is useful for classifying unknown variables based on how similar they are to known variable; the method can be used to compute a set of energy data predictions in the one or more energy variables by comparing the one or more reference energy variables to the one or more energy variables.

In some embodiments, energy storage systems (ESS) can be included in a system to smooth out peak events by charging during periods of low energy load (i.e. nighttime) and discharging during moments of peak load, reducing the required energy from the grid. Energy Storage systems can be comprised of an inverter or other similar device, measured in kW, and a battery or other storage device, measured in kWh. Typically, the savings potential from ESS is based on the inverter size (kW), but the cost of the ESS is based off the battery size (kWh).

In many situations, energy storage can reduce the facilities loads in a "non-invasive" way (i.e. with little to no impact on facility operations); however, the cost of the system is directly related to the size of the battery. The economics of installing storage systems with enough capacity for a 6-8 hour window are poor. Additionally, in some situations, batteries degrade the more they are used, so accurate forecasting allows the system to be used less, which increases their life.

In accordance with aspects of the present disclosure, a system is configured utilizing statistics and machine learning to provide a forecast of coincident peak events, and to control the charging/discharging of an energy storage system (ESS) situated behind-the-meter at a facility.

Embodiments will now be described with reference to the figures. For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other 1 data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

Embodiments of methods, systems, and apparatus are described through reference to the drawings. The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly described.

FIG. 1 is a block diagram showing aspects of an example system 100 for controlling an energy storage system 115. Infrastructure 110 includes one or more devices, machines, electrical connections, and the like which consume electricity. In some embodiments, the infrastructure can include an office building, manufacturing facility, residential or commercial infrastructure, or the like. In some embodiments, electrical infrastructure may refer only to the aspects of the infrastructure which are connected with or otherwise rely on or consume electrical energy from a utility distribution system 102 and/or an energy storage system 115.

The infrastructure is electrically connected to receive electrical energy from the utility distribution system 102 and is also electrically connected to receive electrical energy from the energy storage system 115. In some embodiments, one or more metering devices 105 are installed at connection(s) between the utility distribution system 102 and the infrastructure 110. In some embodiments, the metering device(s) monitor the energy from the utility distribution system 102 that is being utilized/consumed by all infrastructure 110 and other components. The metering device(s) generate meter data, which in some embodiments includes data regarding the rate of electrical energy consumption (e.g. kW), data regarding a quantity of electrical energy consumed (e.g. kWh), data regarding the time/date that the electrical energy is consumed, power outage data, power quality data, voltage data, current data, load data, reactive power, and/or any other data which may be monitored, measured, calculated or otherwise generated by the metering device. In some embodiments, the metering device(s) 105 include an interface for communicating meter data.

The energy storage system 115 includes one or more energy storage devices and/or systems for storing energy which can be provided to the electrical infrastructure. In some embodiments, the energy storage system 115 can include batteries or cells, capacitors, and/or the like. In some embodiments, the energy storage system 115 can store energy in a form which can be converted into electrical energy. In some embodiments, the energy storage system 115 is configured to provide electrical energy to the infrastructure 110.

The energy storage system will have an energy capacity defined at least in part on the capacities of the underlying energy storage devices. In some embodiments, the energy storage system will have an output power rating defined by the rate at which the energy stored by the energy storage system can be provided to the infrastructure. In some embodiments, the output power rating is based on the electrical characteristics of the devices, components and/or circuits of the energy storage system. For example, the size of an inverter can define at least a portion of the rate at which energy can be provided.

In some embodiments, the energy storage system 115 includes a control interface for receiving signals to discharge the energy storage devices or to otherwise provide the energy stored in the energy storage system 115 to the infrastructure. In some embodiments, the received signals can include data messages, instructions, or electrical inputs which trigger or otherwise cause the energy storage devices to be discharged.

In some embodiments, the energy storage system 115 includes one or more processors (e.g. in a control device) which receive the signals and based on these signals, transmits control or instruction signals or otherwise causes the energy storage devices to be discharged.

In some embodiments, the energy storage system 115 is configured to receive and store energy from the utility distribution system 102. In some embodiments, the energy storage system 115 may alternatively or additionally be configured to receive and store energy from other sources (e.g. solar panels). In some embodiments the energy storage system 115 may receive signals to charge the energy storage devices (e.g. via a control interface), or to otherwise store energy from the utility distribution system or elsewhere in the energy storage devices.

The system 100 includes a control system for controlling the energy storage system 115. In some embodiments, the control system generates signals to cause the electrical infrastructure to consume energy stored at the energy storage system 115. In some embodiments, the signals can be sent via Modbus. In some embodiments, the signals can include instructions and/or data indicating when to discharge (or stop discharging), at what rate to discharge and/or what amount of energy to discharge.

The control system includes one or more processors, memories and/or data storage devices 165. In some embodiments, the control system includes a controller 120 which can be or can include a computing device such as a server or computer. In some embodiments, the controller 120 is situated on-site at the infrastructure 110.

In some embodiments, the control system can be entirely implemented at the controller 120. In other embodiments, the control system can include one or more computing devices 120A connected to a consumer's facilities (including for example, the infrastructure, energy storage system, and metering device) via one or more public and/or private networks 135. In some embodiments, the networked computing devices 120A can include central server(s), distributed computing system(s), and/or any number of processors, memories and/or data storage devices in any physical and/or logical arrangement suitable to provide the functions of the control system.

In some embodiments, the control system can be a combination of computing device(s) 120 at the infrastructure location, and computing device(s) 120A connected via the networks 135.

In some embodiments, the control system is configured to access or otherwise obtain historical and real/near-real time data from various data sources. In some embodiments, the control system includes a meter interface for receiving meter data from at least one metering device. In some embodiments, the control system includes an infrastructure interface for receiving infrastructure data measured, generated and/or reported by the infrastructure. In some embodiments, the infrastructure data can include information and/or data regarding electric consumption devices including for example air conditioning, hearing, ventilation systems, lighting, machinery, and the like.

In some embodiments, one or more processors of the control system are configured to identify potential coincident peaks for the utility distribution system based on a forecasted transmission level load and confidence value generated by an artificial neural network. Upon identifying a potential coincident peak, the processor(s) transmit signals to cause the electrical infrastructure to consume energy stored at the energy storage system. In some situations, this reduces the energy drawn from the utility distribution system during the identified potential coincident peak.

In some embodiments, the control system includes a plurality of layered nodes configured to form an artificial neural network (ANN). In some embodiments, the neural network includes many residual blocks of convolutional layers with batch normalization and rectifier nonlinearities. As described herein or otherwise, in some embodiments, the ANN is trained to generate a forecasted transmission level load and confidence value for the entire jurisdiction covered by the utility distribution system.

In other words, in some embodiments, the control system is configured to determine, the transmission-level load of not only the internal electrical infrastructure behind the metering device (e.g. at a customer's premises), but of the entire electrical grid provided by the utility distribution system.

In some embodiments, the systems and methods described herein apply deep learning to energy variables which are related to utility load analysis. In some embodiments, deep learning includes methods that map data through multiple levels of abstraction, where higher levels represent more abstract entities. In some situations, deep learning can provides a fully automatic system for learning complex functions that map inputs to outputs, without using hand crafted features or rules. In some embodiments, the system can includes feedforward neural networks, where levels of abstraction are modeled by multiple non-linear hidden layers. Some embodiments described herein provide systems and methods that receive as input utility load energy variables and apply multiple layers of nonlinear processing units to compute a set of energy data predictions.

Figure 7:
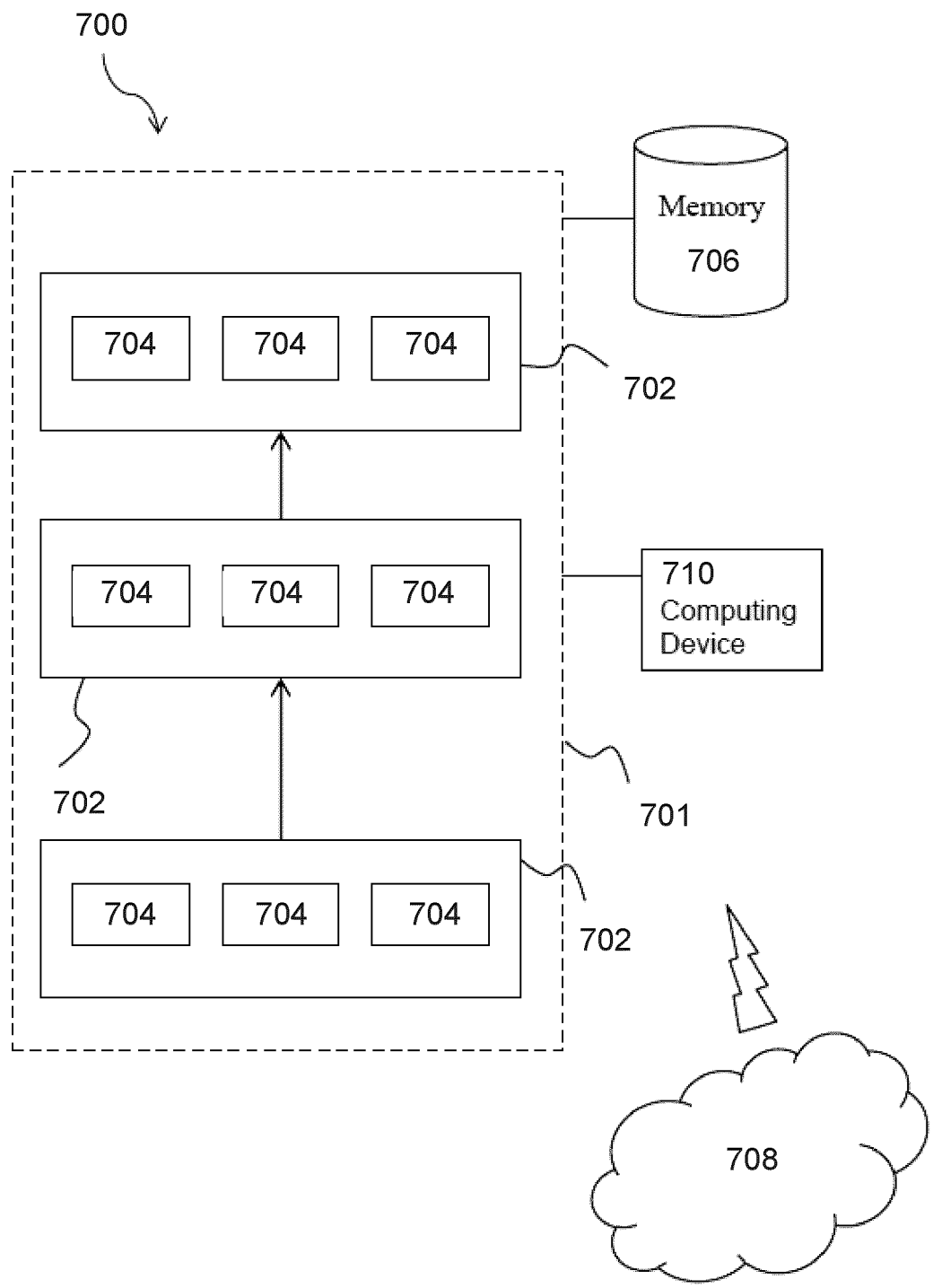
FIG. 7 is a block diagram showing aspects of an example control system 700 for utility load prediction.

Referring now to FIG. 7, shown therein are aspects of an example control system 700 for utility load prediction, comprising a machine learning unit. The machine learning unit is preferably implemented by a deep neural network (DNN) 701. The DNN takes as input a set of energy variables, including features extracted from energy data sets in real-time or from historical data, and produces an output intended to forecast utility load. The quantification of an energy variable can be represented in such a system by one or more real-valued numbers on an absolute or relative scale, with or without meaningful units. In embodiments, the DNN may provide other outputs in addition to outputs intended to forecast utility loads.

The system 700 further comprises a memory 706 communicatively linked to the DNN 701. An illustrated embodiment of the DNN 701 comprising a feedforward neural network having a plurality of layers 702 (i.e. deep) is shown. Each layer comprises one or more processing units 704, each of which implements a feature detector and/or a computation that maps an input to an output. The processing units 704 accept a plurality of parameter inputs from other layers and apply activation functions with associated weights for each such parameter input to the respective processing unit 704. Generally, the output of a processing unit of layer l may be provided as input to one or more processing units of layer l+1.

Each processing unit may be considered as a processing "node" of the network and one or more nodes may be implemented by processing hardware, such as a single or multi-core processor and/or graphics processing unit(s) (GPU(s)). Further, it will be understood that each processing unit may be considered to be associated with a hidden unit or an input unit of the neural network for a hidden layer or an input layer, respectively. The use of large (many hidden variables) and deep (multiple hidden layers) neural networks may improve the predictive performances of the CVP compared to other systems.

In embodiments, inputs to the input layer of the DNN can accept historical load data including previous day and same day previous week load profiles, weather forecasts, real time transmission system data, and features derived from real-time economic factors such as electricity and natural gas pricing, intertie flow data and spark ratios, while outputs at the output layer of the DNN can include energy variables.

The memory 706 may comprise a database for storing activations and learned weights for each feature detector, as well as for storing datasets of utility information and extra information and optionally for storing outputs from the DNN 701. The utility information may provide a training set comprising training data. The training data may, for example, be used for training the DNN 701 to predict energy variables, in which case energy variables with known features may be provided. The memory 706 may further store a validation set comprising validation data.

Generally, during the training stage, the neural network learns optimized weights for each processing unit. After learning, the optimized weight configuration can then be applied to test data. Stochastic gradient descent can be used to train feedforward neural networks. A learning process (backpropagation), involves for the most part matrix multiplications, which makes them suitable for speed up using GPUs. Furthermore, the dropout technique may be utilized to prevent overfitting.

The system may further comprise a computing device 710 communicatively linked to the DNN 701 for controlling operations carried out in the DNN. The computing device may comprise further input and output devices, such as input peripherals (such as a computer mouse or keyboard), and/or a display. The computing device 710 may further be linked to a wireless network 708 for transmitting and receiving data. In embodiments, utility information is received over the network 708 for storage in memory 706. Utility load predictions and lists of energy variable priorities may be displayed to a user via the display.

Though the figures depict possible architecture embodiments, the number of hidden layers, the number of processing units in each layer and their arrangements can range.

The control system is configured to access or otherwise receive data from a number of data sources 160 and/or data repositories 165. In some embodiments, some of all of the data may be received over the network(s) 135. In some embodiments, some of the data may be stored locally at the premises of the infrastructure 110.

In some embodiments, the data sources may be servers, web pages, databases, and/or any combination of computing and storage devices from which input data can be obtained. In some embodiments, input data includes weather data (temperature, humidity, wind, solar radiation, cloud cover, etc.), and electricity market data sets which may be accessed in real or near real time. In some embodiments, the control system stores and/or accesses historical data (e.g. a previous year, month, week, day, hour's energy use; which generating facilities are online, cost of electricity, cost of natural gas, import and export of electricity, etc.).

In some embodiments, data is cleaned or otherwise processed to optimize factor weighting based on those which have the largest impact on load.

In some embodiments, the control system includes a distributed computing and/or cloud based system. For example, aspects of the control system can be built on a Hadoop™ system for distributed storage and/or processing of the data. In some embodiments, the control system collects and analyzes thousands of factors in real or near-real time to predict at which hour a coincident peak will occur.

In some embodiments, the control system is configured to update periodically (e.g. every 5 minutes) throughout a day.

In some embodiments, the control system's ANN is trained to consider a large number of inputs. Coincident peak charges are based on the transmission level load in which an ISO manages the physical and financial markets to properly bill and settle among suppliers and load serving entities. Therefore, the system is not only forecasting the direct electric consumptions of the load side, for example, how much electricity does a province use in this hour from each and every user such as residential homes, manufacturing facilities, and etc. In reality, the system's forecasting target can be expressed as below because the generators connected at distribution level is a net load reduction for the wholesale market on the transmission level:

$$f(x, y) = \sum_{m=1}^{\infty} (x1 + x2 + \ldots + x3) - \sum_{n=1}^{\infty} (y1 + y2 + \ldots + y3)$$

Where
f(x,y)=the total load of forecasting jurisdiction as a function of x and y;
x=each load side resource that consumes electricity; and
y=each generator connected at the distribution network within the jurisdiction of the respective ISO or other equivalent market operator.

Example categories of data considered for forecasting coincident peaks include but are not limited to:

| Category | Description |
| --- | --- |
| Weather | A variety of weather measurements from creditable weather sources, including apparent temperature, wind speed, wind bearing, humidity, UV index and dew point for major locations (e.g. major cities). In some embodiments, the system is based on forecasted weather data, not the actual weather data of certain hour t because when conducting forecasting in real time, there is only forecasted weather data for the future hours. |
| Transmission | Transmission line data including load information such as the power transfer among the intertie zones, condition of the major transmission lines, and the like |
| Load | IESO (Independent Electricity System Operator) published load data in real time and historical load data from a variety of reports including, the Market Totals Reports, Constrained Total Reports, Predispatch totals reports and the Adequacy Reports |
| Pricing | Wholesale market pricing data including the marginal cost of energy and the respective shadow pricing of different nodes across IESO jurisdiction |
| Generators | Both generators on the transmission line and distribution level can be considered. In the transmission level, all generators' production data are collected and are properly located on the respective network |
| Load Side Resources | Information and data containing about all major categories of electric consumptions devices, including air conditioning, heating, ventilation systems, lighting, and the like. |

In some situations, load resources consume energy based on a very large set of direct and indirect factors (over 10,000 factors) which can be correlated among each other in non-linear relationships and also with the hourly energy consumption. For example, the weather condition could impact the load consumption and the production of the solar PV (photovoltaic) farm and the pricing of electricity has a minimal impact in short electricity consumption but could modify the changes in consumption over the medium term.

In some embodiments, the ANN encapsulates or is otherwise configured to consider/solve:

$$Lx1(t)=f(W(t))+f(T(t))+f(L(t))+f(P(t))+f(G(t))+f(LSR(t))$$

Figure 2:
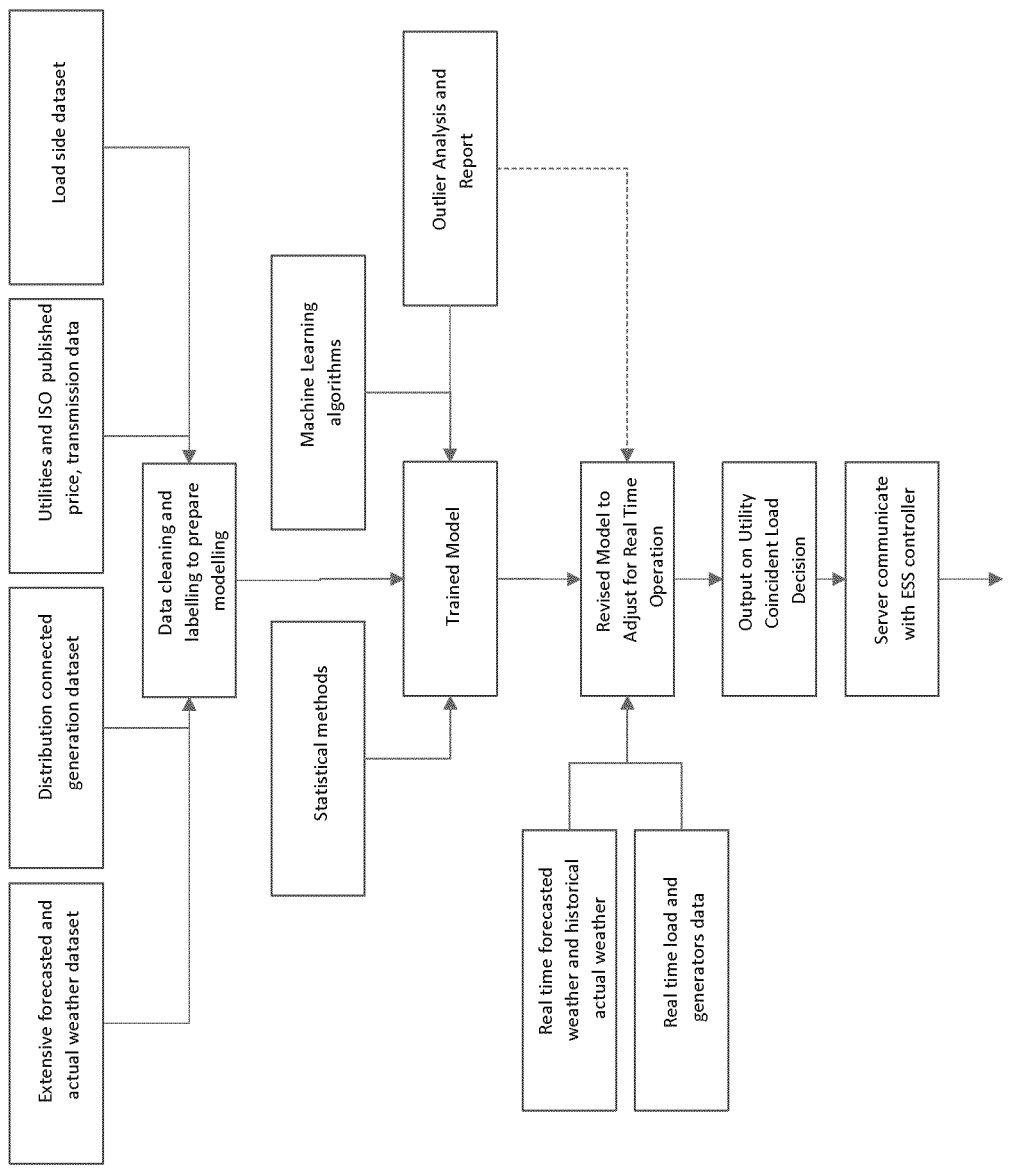
FIG. 2 is a flow chart showing aspects of an example solution for controlling an energy storage system.

Where
L x1 is the consumption of electricity from load resource x1 at hour t
$W(t)$=previous and current weather conditions for hour t
$T(t)$=previous and current transmission conditions for hour t
$L(t)$=previous and current load information for hour t
$P(t)$=previous and current pricing information at hour t
$G(t)$=previous and current generator information at hour t
$LSR(t)$=previous and current load side resource information at hour t FIG. 2 shows aspects of an example end-to-end method for controlling an energy storage system to reduce coincident peak consumption and its related charges.

As noted above or otherwise, in some embodiments, input data can include forecasted and actual weather datasets; distribution connected generation datasets; utilities and IOS published price and transmission data; load-side data; and the like.

In many applications of neural networks, the statistical properties of the data are not taken into account. Seasonal patterns can occur frequently in power usage data in both ISO level and individual load (i.e. a commercial building). Systematic intra-year seasonal fluctuations in newer usage can be cyclical climatic effects or behavior of economic activity.

Figure 3:
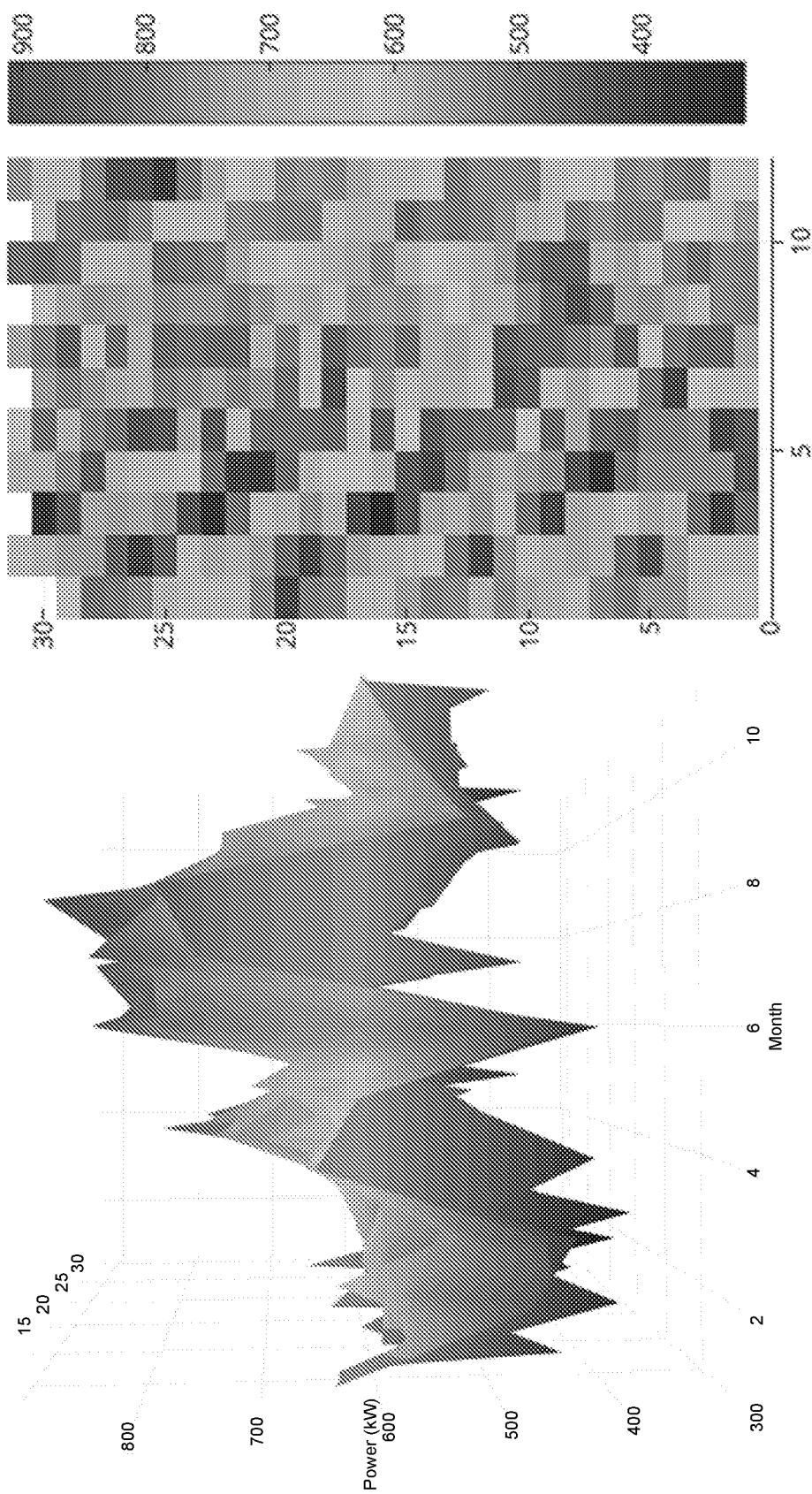
FIG. 3 shows charts illustrating example plots of the power usage of a commercial building.

As illustrated in FIG. 3 which shows plots of the power usage of a commercial building in Toronto from Jan. 1, 2016, to Dec. 31, 2016, the seasonality of power usage data can have a major impact on the neural networks prediction capability. In the plot on the left, the horizontal axis represents the month, the axis into the page represents the day of the month, and the vertical axis represents the power usage. The plot on the right is the same plot in 2D where the horizontal axis represents the month, the vertical axis represents the day of the month, and the power usage is represented by the colour scale. These example plots show that power usage is notably higher in the summer months and shows patterns illustrating that power usage is also higher during week days.

Referring again to FIG. 2, when training the model, data cleaning, statistical methods, and machine learning algorithms can be applied.

In some embodiments, spectral analysis is used for data preprocessing to detect seasonal patterns in the data before feeding to neural networks. In some embodiments, the processors are configured to apply spectral analysis to identify any frequency, relative correlation of variance of the data before feeding it into the model. In some embodiments, spectral analysis is applied to timestamped data, such as electric loads, to generate frequency and amp-type outputs for analysis of trends and unique features of the data or underlying resource(s) such as whether the infrastructure includes a factory.

In addition, in some embodiments, advanced statistics can be utilized in processing the data because the raw datasets have high dimensionality. With the processors, datasets are calculated for their correlation with the specific patterns in ISO load to determine their initial relevance. Pricing data in most of ISO wholesale electricity markets are locational based margin cost of energy (LMP), which are settled on nodes basis every 5 mins in real time market (RTM) and hourly in the day ahead market (DAM). In some situations, a selected pricing point provides information regarding congestions in transmission lines due to many factors including the overall load of the jurisdiction.

In some embodiments, the processors are configured to generate multiple variable regression and confidence intervals. In some embodiments, this statistical analysis includes the application of descriptive statistics on all raw data on in the system, and moves to testing integrity including Chi-square test of independence, correlation among features/labels, and/or ANOVA tests.

In some embodiments, imbalanced datasets are selected to account for infrequently represented conditions (for example, extremely cloudy days or substations repairs). In some situations, this may improve the forecasting of the system over methods which do not utilize imbalanced datasets. In some embodiments, these datasets can be processed with techniques, including but not limited to duplicates datasets, labelling, and batch sizing selection to ensure future modelling and algorithms can perform with increased accuracy. In some embodiments, imbalanced datasets are selected based on the frequency of occurrence and correlation with the ISO level load.

In some embodiments, the system accounts for potentially market-disrupting devices and technologies with advanced controls abilities, such as energy storage devices themselves. In some embodiments, the system collects datasets and processes the current demand response of such projects and/or other devices with controls abilities. In some situations, these assets may reduce ISO load as observed in some ISO jurisdictions. In some situations, by maintaining and processing these data feeds, the control system may more accurately determine load conditions.

In some embodiments, outlier analysis can be conducted to limit the outlier effect on modelling especially in the portion where classification is a primary target.

The system trains and then utilizes a deep neural network $f_\theta$ with parameters $\theta$. This neural net takes the current state and historical raw data state above as an input, and outputs both forecast of power usage of up coming hours and a confidence level of this predict, $(p,v)=f_\theta(s)$. The matrix of p represents the predicted power usage of next few hours. This neural network combines the tasks of both policy network and value network into a single architecture. In some embodiments, the neural network includes many residual blocks of convolutional layers with batch normalization and rectifier nonlinearities.

In some embodiments, the neural network in the control system is consistently self-learning from predicted data with a reinforcement learning algorithm. On each time s, a discrete tabu search is executed, guided by the neural network $f_\theta$. The search outputs confidence level x of each predict. These search confidence levels usually select stronger predict than the raw predict p of the neural network $f_\theta(s)$; discrete tabu may therefore be viewed as a policy improvement operator.

Figure 5:
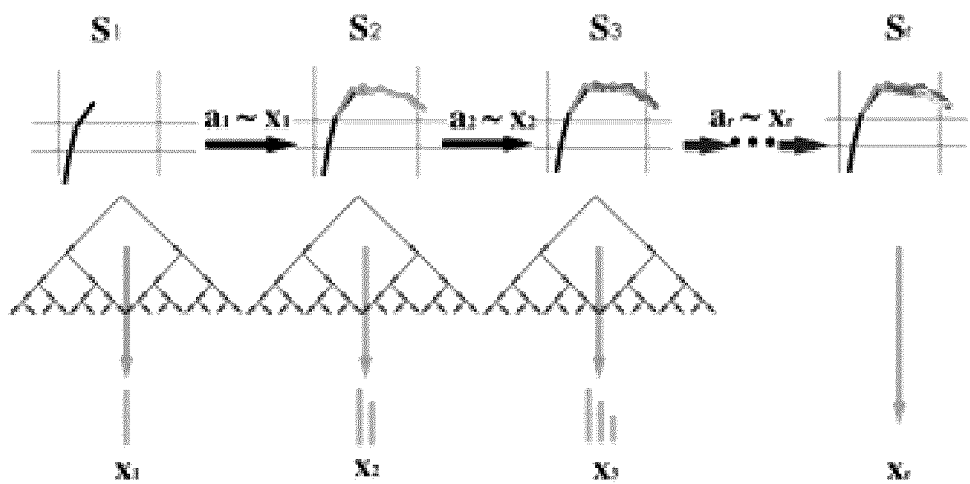
FIG. 5 is a diagram showing aspects of a machine learning process.
Figure 5:
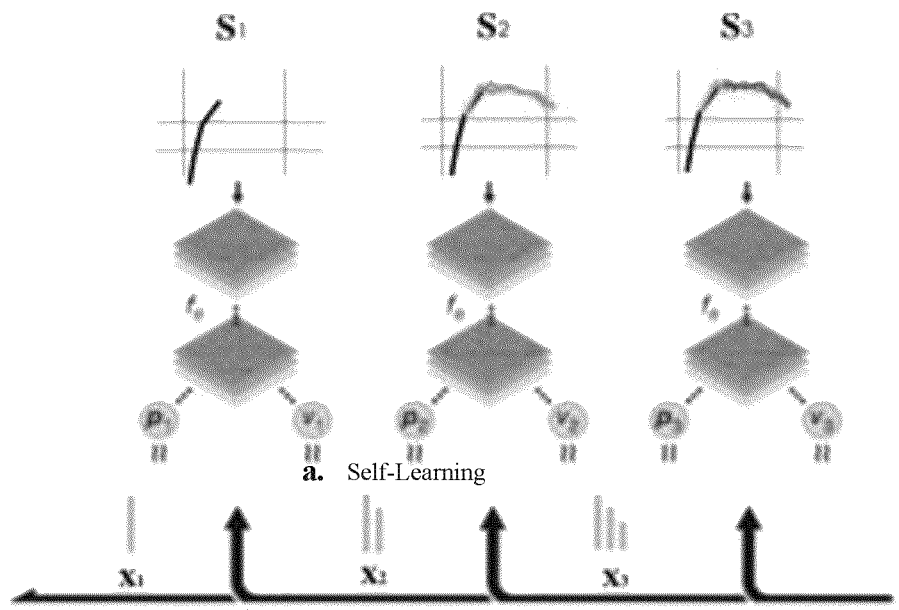

In some embodiments, the system applies a reinforcement learning algorithm by using these search operators repeatedly in a policy iteration procedure: the neural network's parameters are updated to make the move probabilities and value $(p,v)=f_\theta(s)$ more closely match the improved search probabilities and updated actual ISO load value; these new parameters are used in the next iteration of predict to improve the search. FIG. 5 illustrates aspects of an example self-learning pipeline.

In the self-learning phase, the program is predicting mid term ISO level power usage s1, . . . , sT itself. In each time st, a discrete tabu $\alpha_\theta$ is executed using the latest neural network $f_0$. Predictions are selected according to the search probabilities computed by the discrete tabu, at ~xt. The terminal sT is computed according to the previous value.

During training, the neural network receives the raw data st as its input, passes it through many convolutional layers with parameters $\theta$,☐ and outputs matrix pt, representing a mid term forecast, and a scalar value vt, representing the confidence level. The neural network parameters $\theta$ are updated to maximize the similarity of the policy vector pt to the search probabilities xt, and to minimize the error between the predicted value and actual value. The new parameters are used in the next iteration of self-learning.

In some embodiments, the neural network can be configured to train itself by using discrete tabu search to compute each predict. First, the neural network is initialized to random weights $\theta_0$. At each iteration where i≥1, prediction are generated (see FIG. 5, Self-Learning). At each time t, an discrete tabu search $x_t = \alpha_{\theta_{i-1}}(st)$ is executed using the previous iteration of neural network $f_{\theta_{i-1}}$.

The neural network $(p,v)=f_\theta(s)$ is adjusted to minimize the error between the predicted ISO load value and ISO actual load value, and to maximize the similarity of the neural network move probabilities p to the search probabilities x. Specifically, the parameters $\theta$ are adjusted by gradient descent on a loss function 1 that sums over the mean squared error and cross entropy losses, respectively:

$$(p,v)=f_\theta(s) \text{ and } l=(z-v)^2-x^t \log P+c\|\theta\|^2 \quad (1)$$

where c is a parameter controlling the level of L2 weight regularization (to prevent overfitting).

In an example experiment, the learning pipeline was utilized to train the system without human intervention. Over the course of training, more than ten thousand of forecast were generated, using one thousand simulations for each discrete tabu search.

Figure 6:
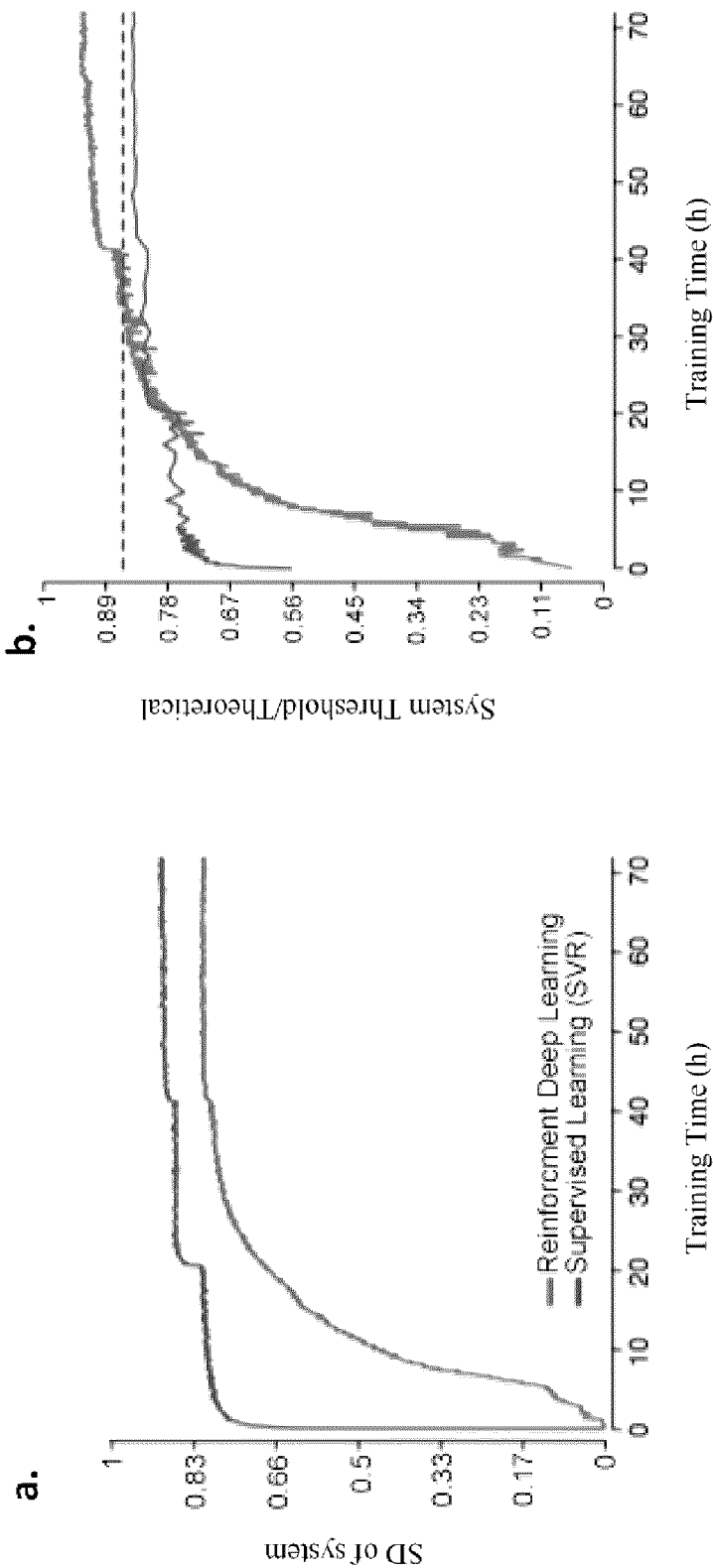
FIG. 6 shows charts illustrating the results of example machine learning processes.

FIG. 6 shows the performance of system during self-learning reinforcement learning, as a function of training time, on accuracy. Learning progressed smoothly throughout training, and did not suffer from the oscillations or catastrophic. It was observed that the system with reinforcement deep learning outperformed a system with support vector regression after 36 hours.

Referring again to FIG. 2, in some embodiments, the trained model (e.g. ANN) is modified to adjust for real time operations. In some embodiments, the model is revised to accommodate missing or delayed data from the real or near real time data feed. For example, an error may include errors from ISO sources. In some embodiments, the algorithms for real time operation are revised to include calculations, models and/or input parameters to generate results without all the data typically fed into the control system.

Figure 4:
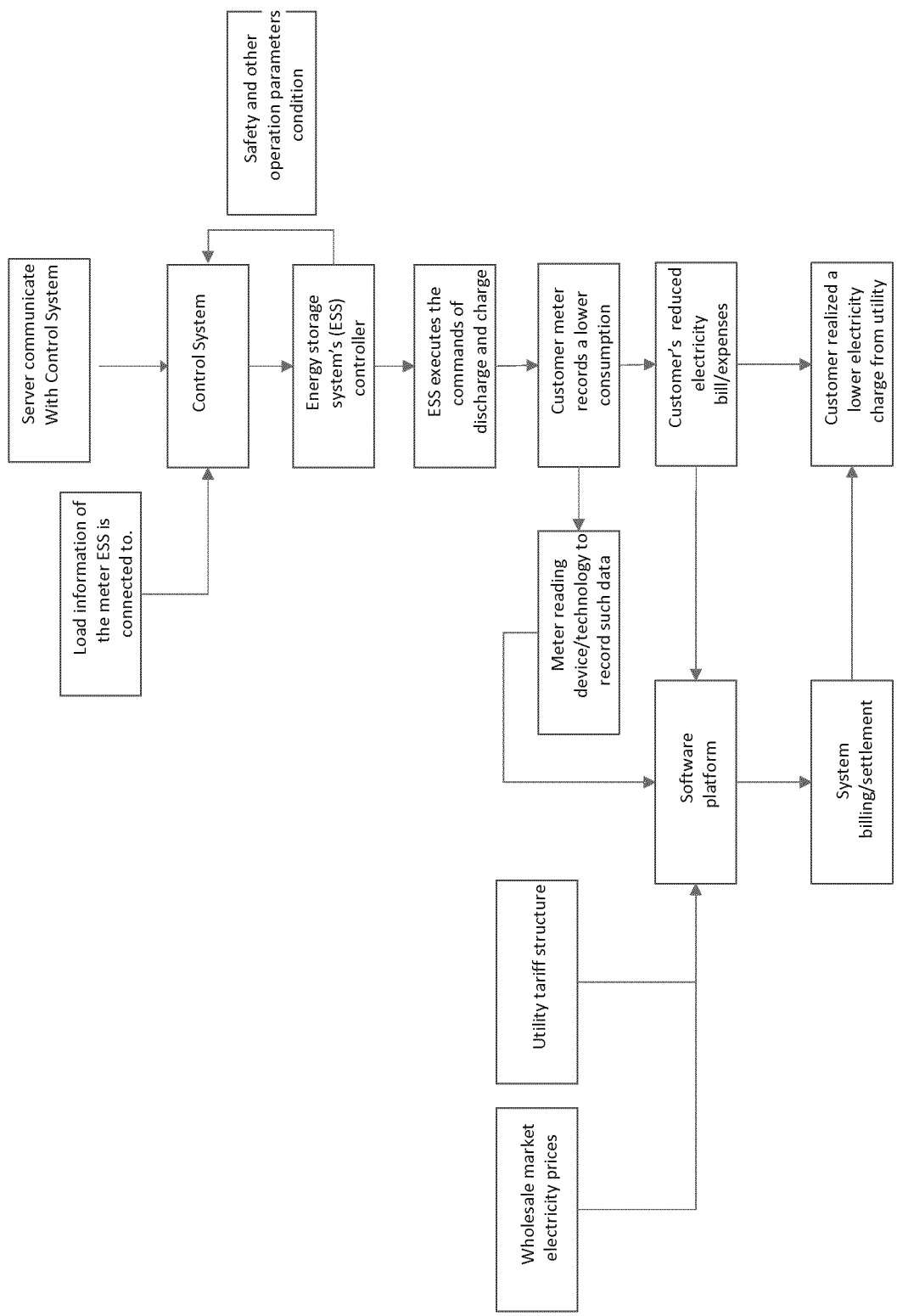
FIG. 4 is a flow chart showing aspects of an example method for operating a control system.

FIG. 4 shows aspects of an example method for operating the control system. In some embodiments, signals may be communicated between the control system and the energy storage system (ESS). In some embodiments, the ESS can be configured to communicate safety and/or operation parameter conditions to the control system.

For example, some energy storage systems, especially the battery types, are based on different chemical materials such as common lithium ion. These materials have safety operation ranges in different environments to prevent damage, fire, explosions, or other negative outcomes. In some embodiments, and depending on the ESS hardware technology utilized, the inputs can include ambient temperature, humidity, cell temperatures, current, reactive power, grid frequency and the like. In some embodiments, these inputs provide the control system with operating parameters for the ESS which can affect the identification of periods during which the ESS should be discharged.

In some embodiments, the ESS may additionally or alternatively communicate data to the control system including target power, operation modes, cell temperatures, real power output, nominal remaining energy, and the like.

In some embodiments, the control system includes a software platform configured to apply algorithms to optimize revenue streams while taking into consideration other information. For example, in some embodiments, the platform can calculate the consumption and savings per the respective rules and collected data from wholesale and tariff structures and then provide billings & settlement services from an accounting perspective.

Upon identifying a potential coincident peak, the processor(s) transmit signals to cause the electrical infrastructure to consume energy stored at the energy storage system. In some situations, this reduces the energy drawn from the utility distribution system during the identified potential coincident peak.

In some embodiments, the transmitted signals cause the electrical infrastructure to consume energy stored at the energy storage system during time periods selected at least in part based on the energy capacity and output power rating of the energy storage system.

For example, in some embodiments, the control system can determine the length of time that the energy stored in the energy storage system will last based on current or projected usage by the infrastructure, and the output power rating. This length of time can affect the time at which time signals to discharge the ESS are generated to maximize the likelihood that the ESS is being discharged during a coincident peak. If the capacity of the ESS is large or the output power rating is low, the signals to discharge may start earlier and/or end later than a predicted coincident peak because the period of time over which the ESS can discharge would be longer.

In some embodiments, by providing more accurate identification of coincident peaks, a system or infrastructure can utilize an ESS with a smaller capacity and still reduce power consumption during coincident peaks. In some situations, this may enable systems to be designed and implemented using smaller and less expensive ESSs. As the capital expenditure required to install an ESS is high, this can result in significant savings.

In some embodiments, the processor(s) determine a potential coincident peak threshold based on historical coincident peak data from previous years and past peak values of the current year. When the forecasted transmission level load exceeds the potential coincident peak threshold value subject to the confidence value, the processor(s) can be configured to generate signals to discharge the energy stored in the ESS.

In some instances, the processors are configured to update the potential coincident peak threshold based on the past peak values in the current year, the quantity of these peaks in the current year, and the number of coincident peaks tracked by the utility distribution system's ISO. For example, if number of potential peaks in the current year have already exceeded the number tracked by the ISO, the processors are less likely to trigger a discharge unless the forecasted transmission level load is close to or higher than the actual transmission level loads of the previous potential coincident peaks.

In some embodiments, at the end of a coincident peak tracking period (e.g. annually), the processors are configured to automatically determine whether the control system triggered the discharge of the ESS during actual coincident peaks, and update the potential coincident peak threshold and ANN parameters.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface.

In embodiments in which elements may be combined, the communication interface may be a software communication interface, such as those for inter-process communication. In still other embodiments, there may be a combination of communication interfaces implemented as hardware, software, and combination thereof.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

The embodiments described herein pervasively and integrally relate to machines, and their uses; and the embodiments described herein have no meaning or practical applicability outside their use with computer hardware, machines, and various hardware components.

Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A control system for controlling an energy storage system, the control system comprising:
   a meter interface for receiving meter data from at least one metering device positioned to track energy drawn by an electrical infrastructure from a utility distribution system;
   an energy storage system interface for communicating with an energy storage system connected to the electrical infrastructure, the energy storage system having an energy capacity and an output power rating; and
   a controller including a plurality of layered nodes configured to form an artificial neural network trained to generate a forecasted transmission level load and confidence value for an entire jurisdiction of the utility distribution system;
   the controller comprising: at least one memory and at least one processor configured for:
      identifying a potential coincident peak for the utility distribution system based on the forecasted transmission level load and confidence value generated by the artificial neural network; and
      upon identifying a potential coincident peak, transmitting signals to cause the electrical infrastructure to consume energy stored at the energy storage system thereby reducing the energy drawn from the utility distribution system during the identified potential coincident peak.

2. The control system of claim 1, wherein the transmitted signals cause the electrical infrastructure to consume energy stored at the energy storage system during time periods selected at least in part based on the energy capacity and output power rating of the energy storage system.

3. The control system of claim 1, wherein the plurality of layered nodes are configured to form the artificial neural network based on a forecasting target defined at least in part on load side resources in the jurisdiction of the utility distribution system, and outputs of generators in the jurisdiction of the utility distribution system.

4. The control system of claim 1, wherein the artificial neural network generates a matrix of forecasted transmission level loads for a defined number of upcoming hours.

5. The control system of claim 1, wherein the controller is configured to update parameters of the artificial neural network based on a reinforcement learning model.

6. The control system of claim 5, wherein updating the parameters of the artificial neural network comprises:
   executing a discrete tabu search of a plurality of time periods with the parameters of the artificial neural network; and
   updating the parameters of the artificial neural network to minimize an error between forecasted transmission level loads for the discrete tabu search time periods and an actual forecasted transmission level load for the time period.

7. The control system of claim 1, wherein the energy storage system is configured to have one or more energy storage devices to provide the energy capacity and output power rating of the energy storage system based on historical coincident peak data and energy consumption rates of the electrical infrastructure.

8. The control system of claim 1, wherein the controller is configured to transmit the signals to cause the electrical infrastructure to consume energy stored at the energy storage system based on a predicted load of the electrical infrastructure.

9. The control system of claim 1, wherein the artificial neural network has inputs relating to previous and current conditions which affect load side resources and generators.

10. The control system of claim 1, wherein the artificial neural network is trained with data preprocessed through spectral analysis to account for at least one of: frequency, relative correlation or variance of electricity consumption and generation data.

11. A method for controlling an energy storage system, the method comprising:
   receiving meter data from at least one metering device positioned between a utility distribution system and an electrical infrastructure, the at least one metering device for tracking energy drawn from the utility distribution system;
   using real-time or near real-time historical and current electricity consumption and generator data with a plurality of layered nodes configured to form an artificial neural network, generating a forecasted transmission level load and confidence value for an entire jurisdiction of the utility distribution system;
   identifying a potential coincident peak for the utility distribution system based on the forecasted transmission level load and confidence value generated by the artificial neural network; and
   upon identifying a potential coincident peak, transmitting signals to cause the electrical infrastructure to consume energy stored at the energy storage system thereby reducing the energy drawn from the utility distribution system during the identified potential coincident peak.

12. The method of claim 11, wherein the transmitted signals cause the electrical infrastructure to consume energy stored at the energy storage system during time periods selected at least in part based on the energy capacity and output power rating of the energy storage system.

13. The method of claim 11, wherein the plurality of layered nodes are configured to form the artificial neural network based on a forecasting target defined at least in part on load side resources in the jurisdiction of the utility distribution system, and outputs of generators in the jurisdiction of the utility distribution system.

14. The method of claim 11, wherein the artificial neural network generates a matrix of forecasted transmission level loads for a defined number of upcoming hours.

15. The method of claim 11, comprising: updating parameters of the artificial neural network based on a reinforcement learning model.

16. The method of claim 15, wherein updating the parameters of the artificial neural network comprises:
   executing a discrete tabu search of a plurality of time periods with the parameters of the artificial neural network; and
   updating the parameters of the artificial neural network to minimize an error between forecasted transmission level loads for the discrete tabu search time periods and an actual forecasted transmission level load for the time period.

17. The method of claim 11, comprising transmitting the signals to cause the electrical infrastructure to consume energy stored at the energy storage system based on a predicted load of the electrical infrastructure.

18. The method of claim 11, wherein the artificial neural network has inputs relating to previous and current conditions which affect load side resources and generators.

19. The method of claim 11, comprising training the artificial neural network with data preprocessed through spectral analysis to account for at least one of: frequency, relative correlation or variance of electricity consumption and generation data.

20. A device for controlling an energy storage system, the device comprising:
- at least one memory and at least one processor providing a plurality of layered nodes configured to form an artificial neural network trained to generate a forecasted transmission level load and confidence value for an entire jurisdiction of the utility distribution system;
- the at least one processor configured for:
  - identifying a potential coincident peak for the utility distribution system based on the forecasted transmission level load and confidence value generated by the artificial neural network; and
  - upon identifying a potential coincident peak, transmitting signals to cause the electrical infrastructure to consume energy stored at the energy storage system thereby reducing the energy drawn from the utility distribution system during the identified potential coincident peak.

* * * * *